United States Patent [19]

Juang et al.

[11] Patent Number: 6,076,053

[45] Date of Patent: Jun. 13, 2000

[54] METHODS AND APPARATUS FOR DISCRIMINATIVE TRAINING AND ADAPTATION OF PRONUNCIATION NETWORKS

[75] Inventors: Biing-Hwang Juang, Warren; Filipp E. Korkmazskiy, Summit, both of N.J.

[73] Assignee: Lucent Technologies Inc., Murray Hill, N.J.

[21] Appl. No.: 09/082,854

[22] Filed: May 21, 1998

[51] Int. Cl.[7] ........................................... G01L 5/06
[52] U.S. Cl. ..................... 704/236; 704/243; 704/255
[58] Field of Search ................... 704/236, 243, 704/244, 251, 256, 231, 255

[56] References Cited

U.S. PATENT DOCUMENTS

| | | | |
|---|---|---|---|
| 5,579,436 | 11/1996 | Chou et al. | 704/244 |
| 5,606,644 | 2/1997 | Chou et al. | 704/243 |
| 5,710,864 | 1/1998 | Juang et al. | 704/238 |
| 5,717,826 | 2/1998 | Setlur et al. | 704/252 |
| 5,797,123 | 8/1998 | Chou et al. | 704/256 |
| 5,805,772 | 9/1998 | Chou et al. | 704/255 |
| 5,806,029 | 9/1998 | Buhrke et al. | 704/244 |
| 5,825,977 | 10/1998 | Morin et al. | 704/255 |

OTHER PUBLICATIONS

Korkmazskiy et al., "Discriminative Training of the Pronunciation Networks," IEEE Workshop on Automatic Speech Recognition and Understanding, pp. 223 to 229, Dec. 1997.

McDermott et al., "Prototype–Based MCE/GPD Training for Word Spotting and Connected Word Recognition," IEEE International Conference on Accoustics, Speech, and Signal Processing, vol. 2, pp. 291 to 294, Apr. 1993.

Chou et al., "Minimum error rate training based on N–best string models," IEEE International Conference on Acoustics, Speech, and Signal Processing, vol. 2, pp. 652 to 655, Apr. 1993.

*Primary Examiner*—David R. Hudspeth
*Assistant Examiner*—Martin Lerner

[57] ABSTRACT

A speech recognition method comprises the steps of using given speech data and the N-best algorithm to generate alternative pronunciations and then merging the obtained pronunciations into a pronunciation networks structure; using additional parameters to characterize a pronunciation network for a particular word; optimizing the parameters of the pronunciation networks using a minimum classification error criterion that maximizes a discrimination between different pronunciation networks; and adapting parameters of the pronunciation networks by, first, adjusting probabilities of the possible pronunciations that may be generated by the pronunciation network for a word claimed to be a true one and, second, to correct weights for all of the pronunciation networks by using the adjusted probabilities.

20 Claims, 8 Drawing Sheets

FIG. 3

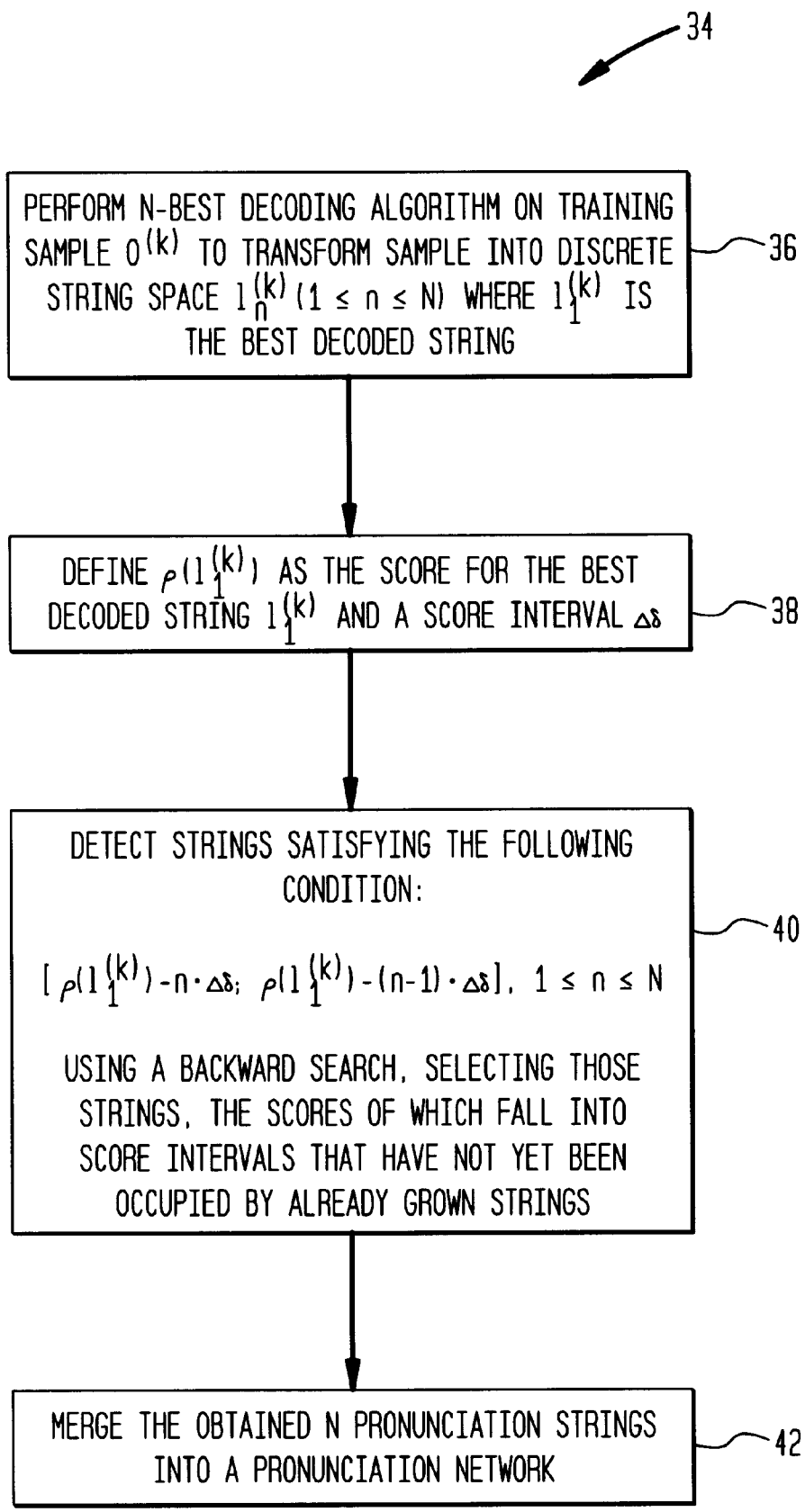

PERFORM N-BEST DECODING ALGORITHM ON TRAINING SAMPLE $O^{(k)}$ TO TRANSFORM SAMPLE INTO DISCRETE STRING SPACE $l_n^{(k)}$ ($1 \leq n \leq N$) WHERE $l_1^{(k)}$ IS THE BEST DECODED STRING —36

DEFINE $p(l_1^{(k)})$ AS THE SCORE FOR THE BEST DECODED STRING $l_1^{(k)}$ AND A SCORE INTERVAL $\Delta s$ —38

DETECT STRINGS SATISFYING THE FOLLOWING CONDITION:

$[p(l_1^{(k)}) - n \cdot \Delta s; \ p(l_1^{(k)}) - (n-1) \cdot \Delta s], \ 1 \leq n \leq N$ USING A BACKWARD SEARCH, SELECTING THOSE STRINGS, THE SCORES OF WHICH FALL INTO SCORE INTERVALS THAT HAVE NOT YET BEEN OCCUPIED BY ALREADY GROWN STRINGS —40

MERGE THE OBTAINED N PRONUNCIATION STRINGS INTO A PRONUNCIATION NETWORK —42

METHODS AND APPARATUS FOR DISCRIMINATIVE TRAINING AND ADAPTATION OF PRONUNCIATION NETWORKS

BACKGROUND OF THE INVENTION

1. Field of the Invention

The present invention relates generally to improvements in the field of speech recognition, and more particularly to advantageous aspects of methods and an apparatus for discriminative training and adaptation of pronunciation networks.

2. Description of the Prior Art

A wide variety of techniques are used to perform speech recognition. Typically, speech recognition starts with the digital sampling of speech. The next stage is acoustic signal processing. Most techniques include spectral analysis.

The next stage is the recognition of phonemes, groups of phonemes, and words. This stage can be accomplished by various processes, including dynamic time warping, hidden Markov modeling, neural networks, expert systems, and combinations of techniques. An HMM-based system is currently the most commonly used and most successful approach for many applications.

A hidden Markov model (HMM) is a stochastic finite state machine that generates strings of states, transitions among which are governed by a set of transition probabilities. In speech recognition applications, the strings are speech signals, and one HMM is trained for each word in the vocabulary. Once a stochastic model has been fitted to a collection of objects, that model can be applied to classify new objects. Thus, given a new speech signal, it can be determined which HMM is most likely to have generated it, and thereby a guess can be made as to which word in the vocabulary has been spoken.

Typical prior-art speech recognition methods suffer from certain disadvantages. For example, prior-art methods may place inordinate demands on memory and computational power resources. Further, these methods may not achieve acceptable results where there is a small amount of training data available for each word.

SUMMARY OF THE INVENTION

One embodiment of the present invention provides a speech recognition method, comprising the steps of using given speech data and the N-best algorithm to generate alternative pronunciations and then merging the obtained pronunciations into a pronunciations networks structure; using additional parameters to characterize a pronunciation networks for a particular word; optimizing the parameters of the pronunciation networks using a minimum classification error criterion that maximizes a discrimination between different pronunciation networks; and adapting parameters of the pronunciation networks by, first, adjusting probabilities of the possible pronunciations that may be generated by the pronunciation network for a word claimed to be a true one and, second, to correct weights for all of the pronunciation networks by using the adjusted probabilities.

Additional features and advantages of the present invention will become apparent by reference to the following detailed description and accompanying drawings.

BRIEF DESCRIPTION OF THE DRAWINGS

FIG. 3 shows a diagram of a method for generating pronunciation networks according to the present invention.

DETAILED DESCRIPTION

Figure 1:
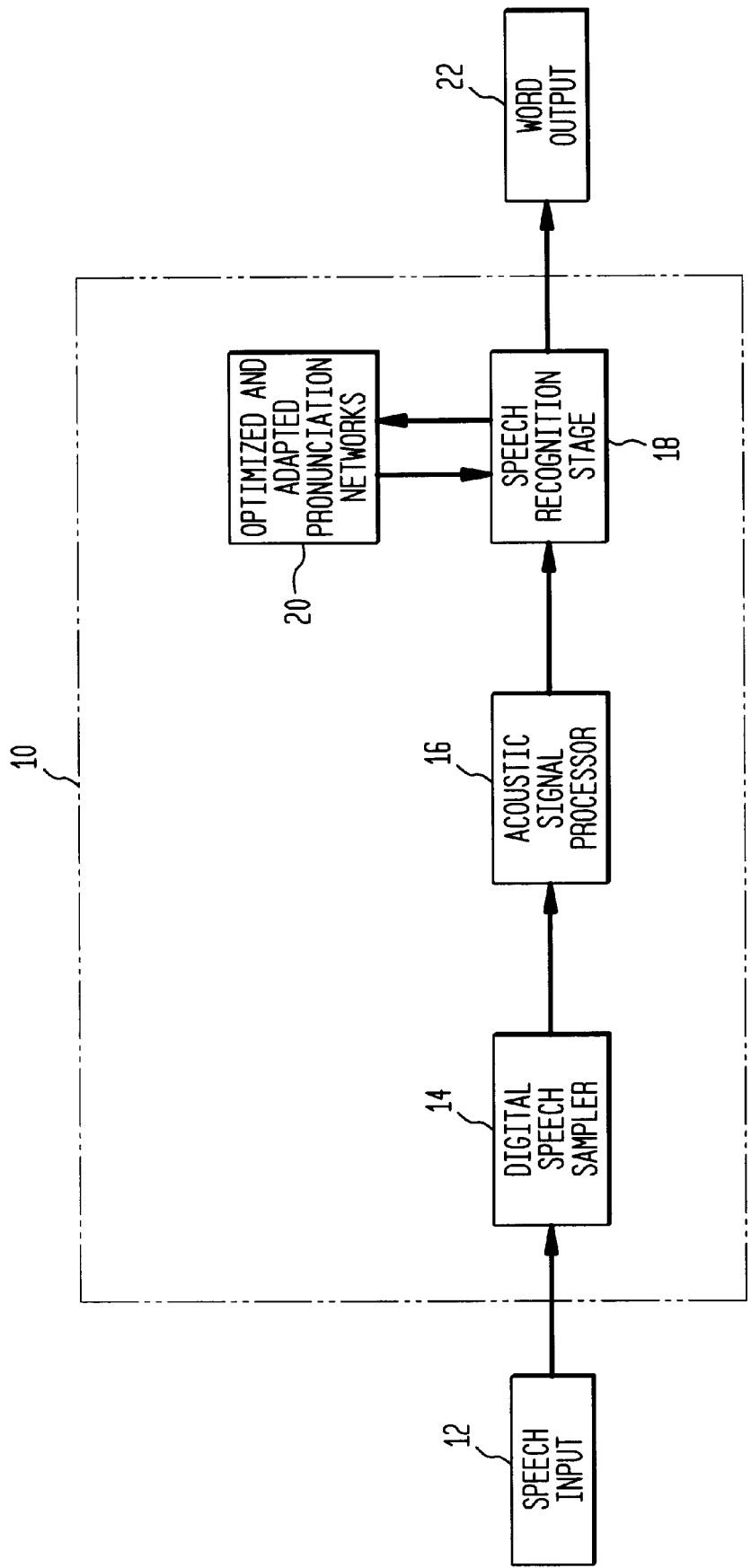
FIG. 1 shows a diagram of a speech recognition system according to the present invention.

FIG. 1 shows a diagram of a speech recognition system 10 according to the present invention. The system can be practiced in a number of environments, including on a personal computer, as well as larger platforms. System 10 receives speech data as an input 12 which is then sampled by digital speech sampler 14 and then processed by acoustic signal processor 16. The data is then passed to a speech recognition stage 18, which compares the data with stored pronunciation networks 20 to determine which subwords and words best match the processed speech data. The recognized words are then provided as an output 22.

Figure 2:
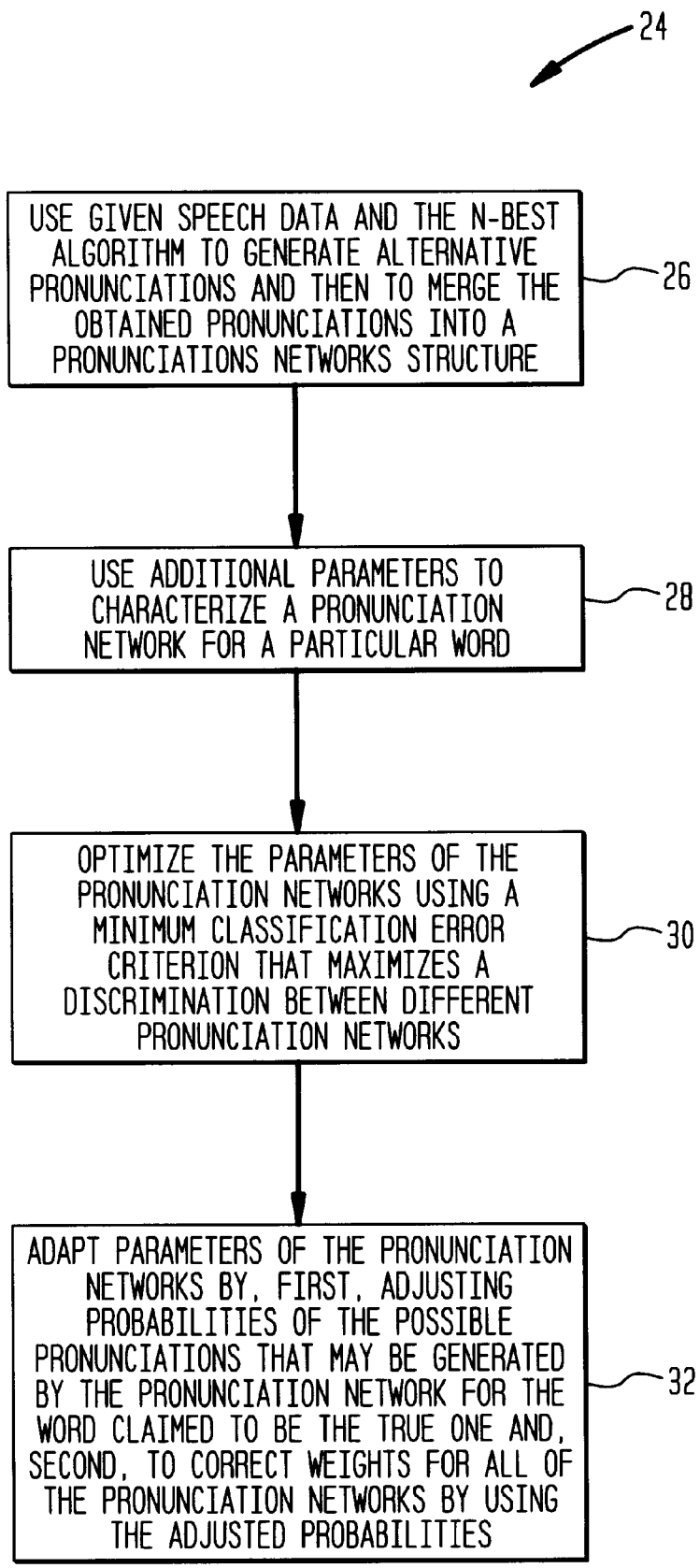
FIG. 2 shows a diagram of a speech recognition method according to the present invention.

The stored pronunciation networks 20 are generated from a training sample and adapted and optimized according to a method 24 illustrated in FIG. 2. In first step 26, the N-best algorithm is performed on a set of given speech data to generate alternative pronunciations and the generated pronunciations are then merged into a pronunciation networks structure. In step 28, additional parameters are used to characterize a pronunciation network for a particular word. In step 30, the parameters, or weights, used in the pronunciation networks structure are optimized using a minimum classification error criterion that maximizes a discrimination between different pronunciation networks. Finally, in step 32, the parameters, or weights, of the pronunciation networks are adapted by, first, adjusting the probabilities of the possible pronunciations that may be generated by the pronunciation network for the word claimed to be the true one and, second, using the adjusted probabilities to correct the weights for all of the pronunciation networks. Each step in this method 24 is described in greater detail below.

In first step 26 of FIG. 2, as basic units for a word presentation, a set A of subword Hidden Markov Models (HMM) is used. To decode a word represented as a string of subword HMMs, it is necessary to use some given grammar that may constrain the sequence of HMMs that are allowed in the string, or just to use a free grammar. Using either grammar, it is possible to construct a few of the most probable pronunciations for some training sample $O^{(k)}$, representing the k-th word network ($1 \leq k \leq K$). According to the present invention, the N-best decoding algorithm is used to construct the N most probable pronunciations. The N-best algorithm transforms the sample $O^{(k)}$, from a feature space X into a discrete string space L:

$$X \Rightarrow L; O^{(k)} \stackrel{N-best}{\Longrightarrow} \{l_n^{(k)}\}, 1 \leq n \leq N$$

where $l_n^{(k)}$ ($1 \leq n \leq N$) is a set of the N-best pronunciations for the sample $O^{(k)}$. All the strings $l_n^{(k)}$ ($2 \leq n \leq N$) cover the space in the vicinity of the best decoded string $l_1^{(k)}$.

In an alternative embodiment of the present invention, it is possible to generate knowledge about possible pronunciation strings in a wider space around the top candidate. First, of course, one may use a larger number for N to cover a wider space around the top candidate $l_1^{(k)}$. Unfortunately, the use of the N-best algorithm can be extremely time expensive. Further, the N-best strings can be too close to each other. Therefore, such strings may not bring any additional information, but may rather only create unnecessary redundancy in the space L.

However, in accordance with the present invention, it is possible to use a "partial path map" to produce some strings that are grouped around the top candidate and positioned at approximately equal distances from each other. The use of this technique ensures that the strings will not be too close to each other, and will therefore avoid redundancy.

Figure 4:
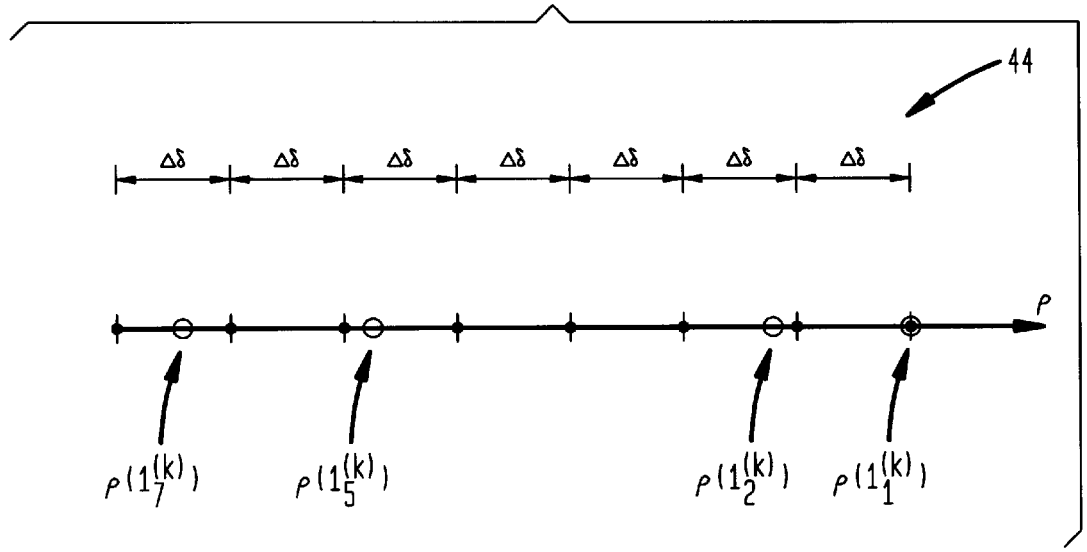
FIG. 4 is a diagram illustrating alternative pronunciations according to their scores.

One suitable "partial path map" technique 34 is shown in FIG. 3. The strings in the partial path map are obtained as follows. First, in step 36 of FIG. 3, as described above, the N-best algorithm is performed. In step 38 of FIG. 3, the score for the best $l_1^{(k)}$ decoded string is defined as $\rho(l_1^{(k)})$. A string resolution $\Delta\epsilon$ is further defined in step 38. Only a single string $l_n^{(k)}$ may fall into the score interval of length $\Delta\epsilon$. This is illustrated in FIG. 4, which shows a diagram of alternative pronunciations 44 according to their scores. Each such interval $\Delta\epsilon$ may be represented analytically as follows:

$$[\rho(l_1^{(k)}) - n \cdot \Delta\epsilon; \rho(l_1^{(k)}) - (n-1) \cdot \Delta\epsilon], 1 \leq n \leq N$$

Figure 5:
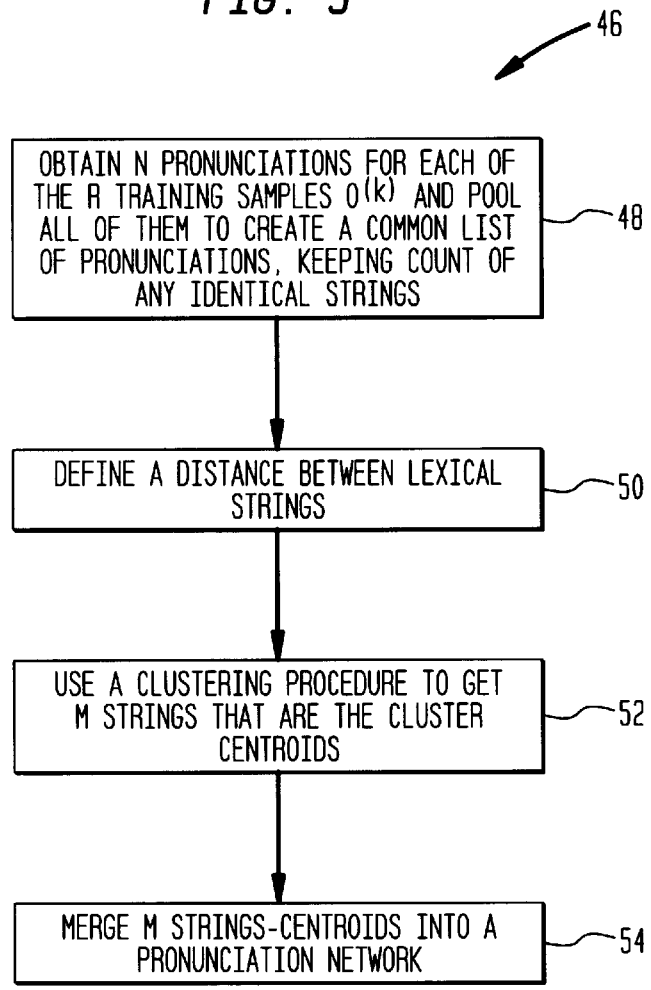
FIG. 5 shows a diagram of a clusterization procedure according to the present invention.

According to the present invention, the detection of strings satisfying the above conditions is accomplished in step 40 of FIG. 3 during a backward search. During the backward search, those strings are selected, the scores of which fall into the score intervals that have not yet been occupied by already grown strings. This procedure does not guarantee that each score interval will have a string. But the proper choice of the parameters $\Delta\epsilon$ and N allow the selection of strings which cover the space around the top candidate. So, if there is only a single training sample available for a word, it is still possible using this method to obtain multiple pronunciation strings for that word. Finally, in step 42 of FIG. 3, using a grammar compiler, the N pronunciation strings obtained are merged, converting them into a pronunciation network.

Where there are multiple training samples $O_r^{(k)}$ ($1 \leq r \leq R$), the pronunciation network is preferably generated by using a clusterization procedure for all the N-best candidates taken from a common list of the N-best strings for all the R training samples. FIG. 5 shows is a flowchart illustrating the clusterization procedure 46, which is implemented as follows:

First, in step 48 of FIG. 5, N pronunciations for each of the R training samples $O^{(k)}$ are obtained. They are all pooled to create a common list of pronunciations, keeping count of any identical strings.

Second, in step 50, a distance between lexical strings is defined using, for example, a Levinstein distance or a distance obtained as the result of a Viterbi decoding.

Third, in step 52, a clustering procedure (e.g., K-means) is used to get M strings that are the cluster centroids.

Finally, in step 54, the M string-centroids are merged into a pronunciation network. Each arc of the pronunciation network corresponds to the subword unit, or phoneme.

Figure 6:
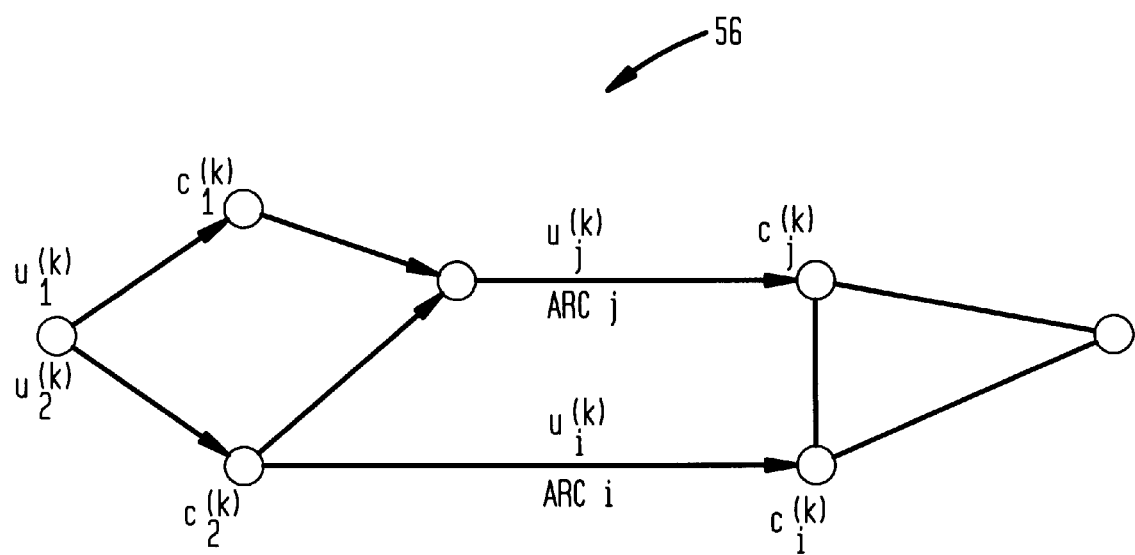
FIG. 6 shows a graph of a pronunciation network for the word k, which has been generated based upon a training sample.

FIG. 6 shows a graph of a pronunciation network 56 for the word k, which has been generated based upon a training sample, as discussed above. According to the present invention, additional parameters, or weights, can be used to characterize a pronunciation network for a particular word. The weighting may be performed as described in conjunction with step 28 of FIG. 2, above. The present invention preferably provides two levels of weighting: arc level weighting and state level weighting.

In arc level weighting, arc j is assigned a score $\rho_j^{(k)}$. In a presently preferred embodiment, this score is a logarithm of the likelihood. Applying arc level weighting, we obtain a modified score $g_j^{(k)}$:

$$g_j^{(k)} = u_j^{(k)} \cdot \rho_j^{(k)} + c_j^{(k)} \tag{1}$$

In state level weighting, the weights serve to weight the state scores for each of the subword (phoneme) HMMs assigned to the specific arc j of the pronunciation network for the k-th word. Applying the state level weighting, a modified score $g_j^{(k)}$ is obtained as follows:

$$g_j^{(k)} = \sum_{s=1}^{S_j^{(k)}} [w_{js}^{(k)} \cdot \rho_{js}^{(k)} + c_{js}^{(k)}] \tag{2}$$

where $w_{js}^{(k)}$ is a state weight multiplicative term for the s-th state of the j-th arc HMM in the pronunciation network for the k-th word, $\rho_{js}^{(k)}$ is a corresponding score for the s-th state, $c_{js}^{(k)}$ is a state weight additive term, $S_j^{(k)}$ is a total number of HMM states for the subword unit assigned to the j-th arc of the pronunciation network for the k-th word.

To characterize the pronunciation network, it is also possible to use estimates of the probabilities $\hat{P}(l_n^{(k)}|\Lambda)$ for all the $N^{(k)}$ phonemes strings $l_n^{(k)}$ ($1 \leq n \leq N$) which may be generated by the k-th word pronunciation network. Upon initialization, the pronunciation network parameters $\hat{P}(l_n^{(k)}|\Lambda)$ can be evaluated by counting the number of the elements (strings of phonemes) which were assigned to the n-th cluster of the k-th word pronunciation network ($l_n^{(k)}$ is preferably the centroid for such a cluster). $\hat{P}(l_n^{(k)}|\Lambda)$ should be modified during an adaptation of the k-th word pronunciation network if that word is supposed to be the true one.

In addition to the arc and state score weighting described above, we can also define a phone duration weighting, in which the phone HMMs are semi-Markov models:

$$G_j^{(k)} = g_j^{(k)} + z_j^{(k)} \cdot \phi(T_j^{(k)}) + x_j^{(k)} \tag{3}$$

Here, $G_j^{(k)}$ is a modified score for the j-th arc of the k-th word pronunciation network. The score $g_j^{(k)}$ should be evaluated either by formula (1) or formula (2). The term $z_j^{(k)}$ is a multiplicative term for the duration weighting. $x_j^{(k)}$ is a corresponding additive term for the duration weighting. It defines a phone insertion penalty. $T_j^{(k)}$ is a duration for the semi-Markov HMM, assigned to the j-th arc of the k-th word pronunciation network. $T_j^{(k)}$ is usually evaluated after the Viterbi decoding. $\phi(T_j^{(k)})$ is a log probability to get the duration $T_j$. Usually, $\phi(T_j^{(k)})$ is presented by the logarithm of a $\gamma$-function.

Figure 7:
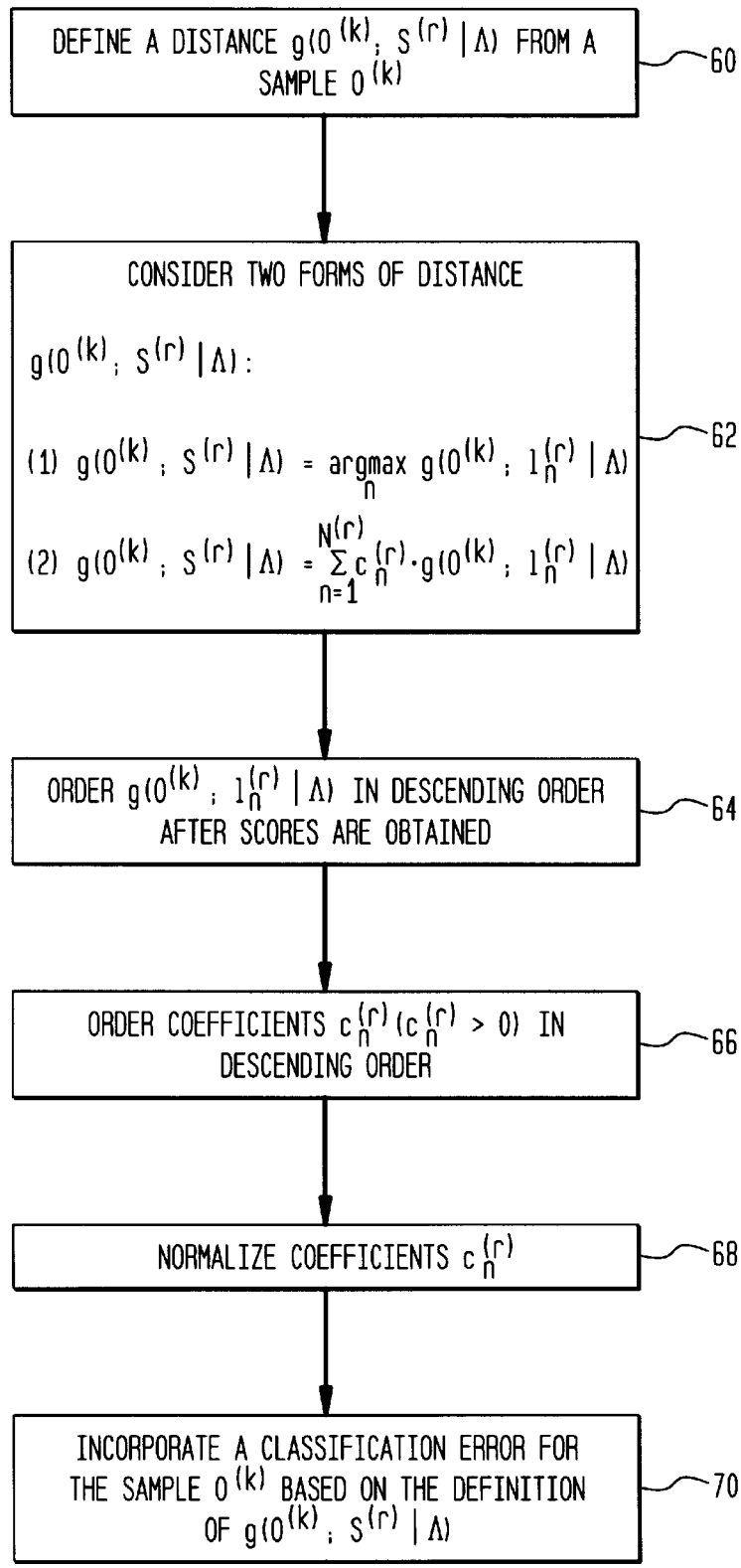
FIG. 7 shows a flowchart illustrating a method according to the present invention for optimizing the parameters of the pronunciation networks.

FIG. 7 shows a flowchart illustrating a method 58 according to the present invention for optimizing the parameters (i.e., weights) of the pronunciation networks are optimized as follows. This optimization, shown as step 30 of FIG. 2, is performed after there has been constructed pronunciation networks S(k) (1≦k≦K) for all K words from the word vocabulary. According to the present invention, a discriminative minimum classification error (MCE) criterion is used to optimize the parameters of the pronunciation networks. In step 60, a distance $g(O^{(k)}; S^{(r)}|\Lambda)$ is defined from a sample $O^{(k)}$ representing the k-th word to the pronunciation network $S^{(r)}$. $\Lambda$ is a set of the phoneme HMMs. As shown in step 62, two forms of the distance $g(O^{(k)}; S^{(r)}|\Lambda)$ are considered. The first is as follows:

$$g(O^{(k)}; S^{(r)} | \Lambda) = \underset{n}{\mathrm{argmax}}\, g(O^{(k)}; l_n^{(r)} | \Lambda) \qquad (4)$$

Here, $l_n^{(r)}$ is a lexical string produced by the pronunciation network $S^{(r)}$. n runs over all possible $N^{(r)}$ lexical strings, which can be produced by the network $S^{(r)}$. The distance $g(O^{(k)}; S^{(r)}|\Lambda)$ is an accumulated score obtained as a result of the Viterbi decoding of the sample $O^{(k)}$ versus the sequence of the phoneme HMMs representing the corresponding n-th pronunciation of the pronunciation network $S^{(r)}$. Another form for the distance $g(O^{(k)}; S^{(r)}|\Lambda)$ is:

$$g(O^{(k)}; S^{(r)} | \Lambda) = \sum_{n=1}^{N^{(r)}} c_n^{(r)} \cdot g(O^{(k)}; l_n^{(r)} | \Lambda) \qquad (5)$$

As shown in step 64, $g(O^{(k)}; l_n^{(r)}|\Lambda)$ are ordered in the descending order after scores are obtained from applying one of formulas (1), (2) or (3):

$$g(O^{(k)}; l_n^{(r)}|\Lambda) \geq g(O^{(k)}; l_{n+1}^{(r)}|\Lambda) \qquad (6)$$

As shown in step 66, the coefficients $c_n^{(r)}$ ($c_n^{(r)}>0$) are also ordered in descending order:

$$c_n^{(r)} \geq c_{n+1}^{(r)} \qquad (7)$$

In step 68, coefficients $c_n^{(r)}$ are normalized such that the following condition is satisfied:

$$\sum_{n=1}^{N^{(r)}} c_n^{(r)} = 1 \qquad (8)$$

The coefficients $c_n^{(r)}$ can be generated from a parametrical family of functions. For example:

$$c_n^{(r)}=exp(-\gamma^{(r)} \cdot n),\ \gamma^{(r)}>0 \qquad (9)$$

Finally, in step 70, based on the definition of $g(O^{(k)}; S^{(r)}|\Lambda)$, a classification error can be incorporated for the sample $O^{(k)}$, meaning that $O^{(k)}$ represents the true word k:

$$L\left(O^{(k)} | \Lambda, \{S^{(r)}\}_{\substack{1\leq r\leq K \\ r\neq k}}\right) =$$

$$-g(O^{(k)}; S^{(k)} | \Lambda) + \frac{1}{\eta}\log\frac{1}{K-1}\sum_{\substack{r=1 \\ r\neq k}}^{K}\exp[-\eta \cdot g(O^{(k)}; S^{(r)} | \Lambda)], \eta = 0 \qquad (10)$$

Here, K is the total number of pronunciation networks, and $g(O^{(k)}; S^{(r)})$ is a distance from the sample $O^{(k)}$ to the pronunciation network $S^{(r)}$. Thus, the task is to find an optimal set of parameters $\{\overline{\beta}_{opt}^{(k)}\}$ for all K (1≦k≦K) pronunciation networks that minimizes the expectation of the classification error $$L\left(O^{(k)} | \Lambda; \{S^{(r)}\}_{\substack{1\leq r\leq K \\ r\neq k}}; \{\overline{\beta}^{(k)}\}_{1\leq k\leq K}\right)$$

conditioned by the set of the pronunciation network parameters $\{\overline{\beta}^{(k)}\}_{1\leq k\leq K}$:

$$\{\overline{\beta}_{opt}^{(k)}\}_{1\leq k\leq K} = \underset{\{\overline{\beta}^{(k)}\}_{1\leq k\leq K}}{\mathrm{argmin}}\, E\left[L\left(O^{(k)} | \Lambda, \{S^{(r)}\}_{\substack{1\leq r\leq K \\ r\neq k}}, \{\overline{\beta}^{(k)}\}_{1\leq k\leq K}\right)\right] \qquad (11)$$

Let us consider $g(O^{(k)}; l_n^{(r)}|\Lambda)$ as a function of the estimated probability $\hat{P}(l_n^{(r)}|\Lambda)$. For this case, the expression for $g(O^{(k)}; l_n^{(r)}|\Lambda)$ will take the following form:

$$g(O^{(k)}; l_n^{(r)}|\Lambda)=g(O^{(k)}|\Lambda; l_n^{(r)})+\log\hat{P}(l_n^{(r)}|\Lambda) \qquad (12)$$

The last expression can be obtained by taking a logarithm of the corresponding estimate for the conditional probability $\hat{P}(O^{(k)}; l_n^{(r)}|\Lambda)$:

$$\hat{P}(O^{(k)}, l_n^{(r)}|\Lambda)=\hat{P}(O^{(k)}|\Lambda; l_n^{(r)})\times\hat{P}(l_n^{(r)}|\Lambda) \qquad (13)$$

And $g(O^{(k)}; l_n^{(r)}|\Lambda)$ and $g(O^{(k)}|\Lambda; l_n^{(r)})$ are expressed as follows:

$$g(O^{(k)}; l_n^{(r)}|\Lambda)=\log\hat{P}(O^{(k)}, l_n^{(r)}|\Lambda) \qquad (14)$$

and $$g(O^{(k)}|\Lambda; l_n^{(r)})=\log\hat{P}(O^{(k)}|\Lambda; l_n^{(r)}) \qquad (15)$$

Therefore, it can be concluded that the set of optimal parameters $\{\overline{\beta}_{opt}^{(k)}\}_{1\leq k\leq K}$ is conditioned by the values of the lexical strings' probability estimates $\hat{P}(l_n^{(r)}|\Lambda)$ (1≦k≦K; 1≦n≦$N^{(r)}$). It is possible to apply different numerical methods to get an optimal parameter set $\{\overline{\beta}_{opt}^{(k)}\}_{1\leq k\leq K}$ An example of such a method is the GPD method described in B. H. Juang and S. Katagiri, "Discriminative learning for minimum error classification," *IEEE Trans. on Signal Processing,* 40 (12), pp. 3043–3054, December 1992, which is incorporated herein by reference.

Figure 8:
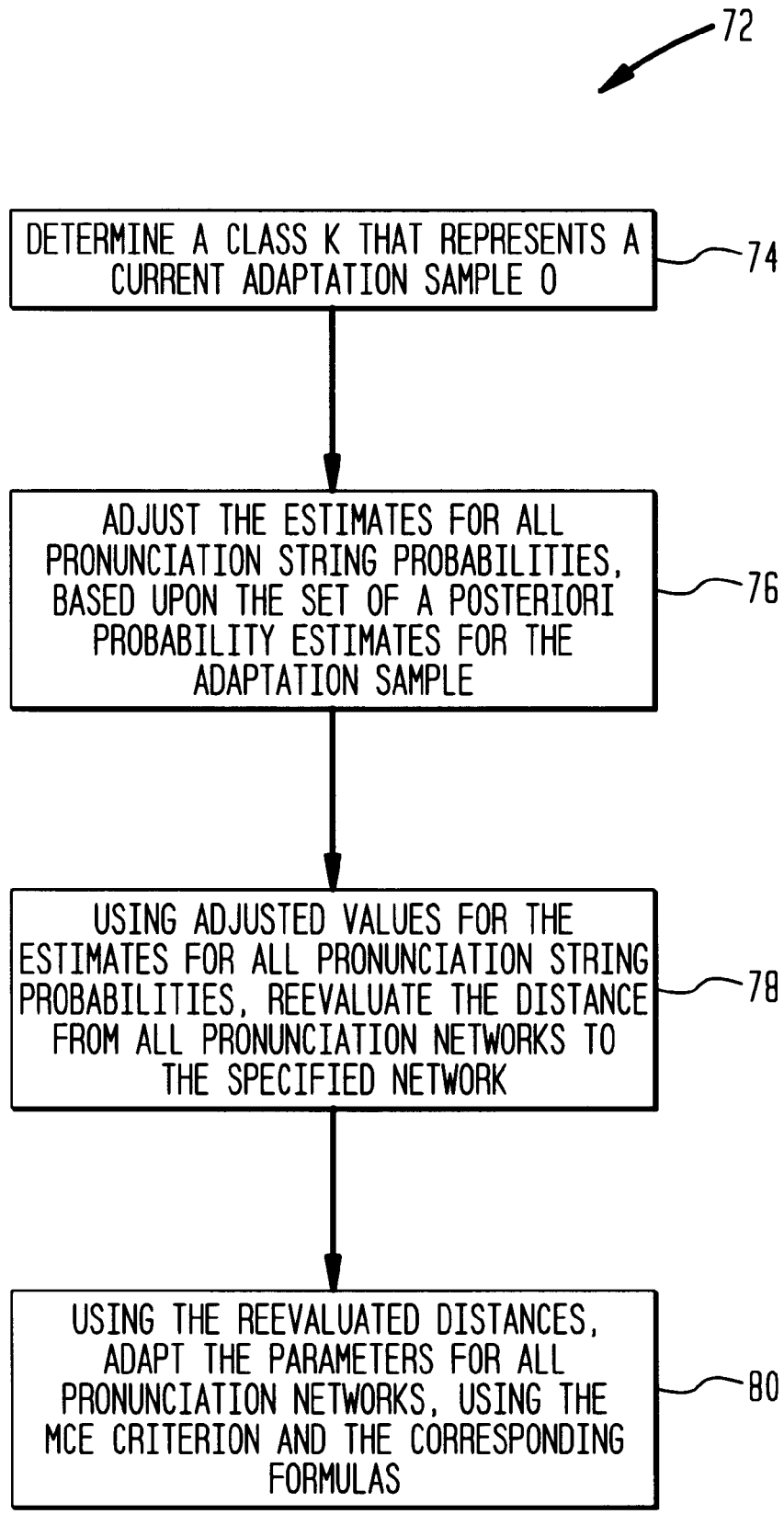
FIG. 8 illustrates a method for adapting the parameters that describe the pronunciation networks.

As shown in FIG. 2, after the parameters have been optimized in step 30, they are then adapted in step 32. FIG. 8 illustrates the method 72 for adapting the parameters that describe the pronunciation networks, which comprises the following steps:

Step 74: Determine a class k that represents a current adaptation sample O (in the supervised or unsupervised manner):

$$O \Rightarrow O^{(k)}$$

Step 76: Adjust the estimates $\hat{P}(l_n^{(k)}|\Lambda)$ for all pronunciation string probabilities (1≦n≦$N^{(k)}$). The adjustment is based on the set of a posteriori probability estimates for the adaptation sample $O^{(k)}$. This set consists of $N^{(k)}$ probability estimates $\hat{P}(O^{(k)}|\Lambda, l_n^{(k)})$.

Step 78: Using the adjusted values for $\hat{P}(l_n^{(k)}|\Lambda)$, reevaluate the distances $G(S^{(r)}; S^{(k)})$ from all of the pronunciation networks $S^{(r)}$(1≦r≦K) to the specified network $S^{(k)}$, applying the formulae (4), (5), (6), and (13) above.

Step 80: Using the reevaluated distances $G(S^{(r)}; S^{(k)})$, adapt the parameters for all pronunciation networks. For the optimization, use the MCE criterion and the corresponding formulae (11) and (12) above.

Figure 9:
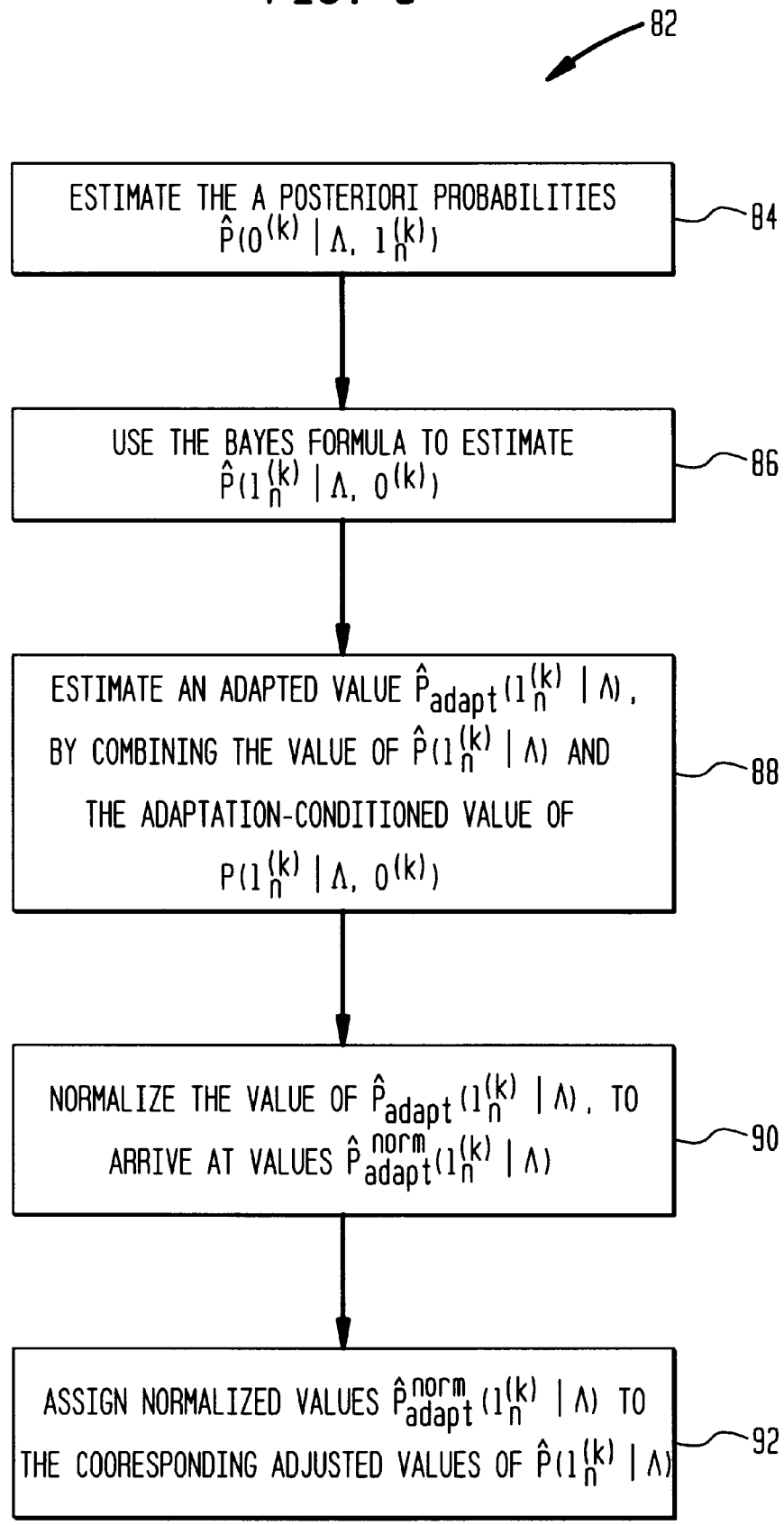
FIG. 9 is a flowchart illustrating a method for adjusting probability estimates for an adapting sample according to the present invention.

FIG. 9 shows a diagram of a method 82 for adjusting the estimates $\hat{P}(l_n^{(k)}|\Lambda)$ for a new adaptation sample $O^{(k)}$ representing the k-th pronunciation network (step 58 of FIG. 7), which is accomplished as follows:

Step 84: Estimate the a posteriori probabilities:

$$\hat{P}(O^{(k)}|\Lambda, l_n^{(k)}) = \exp[\hat{g}(O^{(k)}|\Lambda, l_n^{(k)})]; \; 1 \leq n \leq N^{(k)} \quad (16)$$

Here $\hat{g}(O^{(k)}|\Lambda, l_n^{(k)})$ is a likelihood score obtained after the Viterbi decoding of the sample $O^{(k)}$ versus the phone string $l_n^{(k)}$. The total number of such phone strings for the network k is $N^{(k)}$.

Step 86: Using the Bayes formula, estimate $\hat{P}(l_n^{(k)}|\Lambda, O^{(k)})$:

$$\hat{P}(l_n^{(k)}|\Lambda, O^{(k)}) = \frac{\hat{P}(O^{(k)}|\Lambda, l_n^{(k)})}{\sum_{n=1}^{N^{(k)}} \hat{P}(O^{(k)}|\Lambda, l_n^{(k)})} \quad (17)$$

Step 88: To estimate an adapted value $\hat{P}_{adapt}(l_n^{(k)}|\Lambda)$, the value of $\hat{P}(l_n^{(k)}|\Lambda)$ and the adaptation-conditioned value of $\hat{P}(l_n^{(k)}|\Lambda, O^{(k)})$ are combined:

$$\hat{P}_{adapt}(l_n^{(k)}|\Lambda) = L \cdot \hat{P}(l_n^{(k)}|\Lambda) + (1-L) \cdot \hat{P}(l_n^{(k)}|\Lambda, O^{(k)}); \; 1 \leq n \leq N^{(k)} \quad (18)$$

where 0<L<1. L may be some constant, or a function that is dependent on time.

Step 90: To normalize the value of $\hat{P}_{adapt}(l_n^{(k)}|\Lambda)$, the following formula is applied:

$$\hat{P}_{adapt}^{norm}(l_n^{(k)}|\Lambda) = \frac{\hat{P}_{adapt}(l_n^{(k)}|\Lambda)}{\sum_{n=1}^{N^{(k)}} \hat{P}_{adapt}(l_n^{(k)}|\Lambda)}; \; 1 \leq n \leq N^{(k)} \quad (19)$$

Step 92: The final result is $N^{(k)}$ normalized values $\hat{P}_{adapt}^{norm}(l_n^{(k)}|\Lambda)$ that may be assigned to the corresponding adjusted values of $\hat{P}(l_n^{(k)}|\Lambda)$:

$$\hat{P}(l_n^{(k)}|\Lambda) = P_{adapt}^{norm}(l_n^{(k)}|\Lambda); \; 1 \leq n \leq N^{(k)} \quad (20)$$

The method of the present invention achieves a number of advantages. For example, it allows the generation of a word pronunciation network by using either a single training sample or a small number of training samples. This advantage is very important for mobile speech recognition systems having constraints on memory and computational power resources. It is also important for the task of large vocabulary speech recognition, where there are typically a small number of training data for each word.

The method uses a discriminative training approach to optimize the parameters of the pronunciation networks. This discriminative training allows the reduction of the degree of confusion between different pronunciation networks.

The method doesn't require any specific phonemic or phonetic knowledge to create a pronunciation networks structure.

The discriminative adaptation of the pronunciation network parameters can be done with only a single adaptation sample.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A speech recognition method, comprising:

using given speech data and the N-best algorithm to generate alternative pronunciations and then merging the obtained pronunciations into a pronunciation network structure containing pronunciation networks for words in the given speech data;

using additional parameters to characterize the pronunciation network for a particular word;

optimizing the parameters used to characterize the pronunciation network using a minimum classification error criterion that maximizes a discrimination between pronunciation networks for different words;

adapting parameters used to characterize the pronunciation network by, first, adjusting probabilities of the possible pronunciations that may be generated by the pronunciation network for a word claimed to be a true one and, second, to correct weights for all of the pronunciation networks in the pronunciation network structure by using the adjusted probabilities.

2. A method for generating alternative pronunciations from given speech data contained in a training sample $O^{(k)}$, the method comprising:

performing the N-best algorithm on training sample $O^{(k)}$, transforming it from a feature space X into a discrete string space L:

$$X \Rightarrow L; O^{(k)} \stackrel{N-best}{\Rightarrow} \{l_n^{(k)}\}, \; 1 \leq n \leq N$$

where $l_n^{(k)}$ ($1 \leq n \leq N$) is a set of N-best pronunciations for the sample $O^{(k)}$, and where the strings $l_n^{(k)}$ ($2 \leq n \leq N$) cover the space in the vicinity of best decoded string $l_1^{(k)}$;

defining the score for best decoded string $l_n^{(k)}$ as $\rho(l_1^{(k)})$ and defining a score interval $\Delta\epsilon$;

detecting strings satisfying the following condition:

$[\rho(l_1^{(k)}) - n \cdot \Delta\epsilon; \rho(l_1^{(k)}) - (n-1) \cdot \Delta\epsilon], \; 1 \leq n \leq N$ using a backward search, selecting those string, the scores of which fall into score intervals that have not yet been occupied by already grown strings;

merging the obtained N pronunciation strings into a pronunciation network.

3. A method according to claim 2, wherein there are multiple training samples $O^{(k)}$ ($1 \leq r \leq R$), and wherein the step of merging the obtained N pronunciation strings into a pronunciation network including the step of using a clusterization procedure for all the N-best candidates taken from a common list of the N-best strings for all the R training samples.

4. A method according to claim 3, wherein the clusterization procedure comprises:

obtaining N pronunciations for each of the R training samples $O^{(k)}$ and pooling all of them to create a common list of pronunciations, keeping count of any identical strings;

defining a distance between lexical strings;

using a clustering procedure to get M strings that are the cluster centroids; and merging the M strings-centroids into a pronunciation network, each arc of the pronunciation network corresponding to a subword unit.

5. A method according to claim 4, wherein the step of defining a distance between lexical strings includes using a Levinstein distance.

6. A method according to claim 4, wherein the step of defining a distance between lexical strings includes using a distance obtained as the results of a Viterbi decoding.

7. A method according to claim 4, wherein the step of using a clustering procedure includes using a K-means clustering procedure.

8. A method according to claim 2, further including the following step:

using additional parameters to characterize a pronunciation network for a particular word.

9. A method according to claim 8, wherein the step of using additional parameters to characterize a pronunciation network for a particular word includes assigning a score $\rho_j^{(k)}$ to arc j for the word and obtaining a modified score $g_j^{(k)}$ using the following formula:

$$g_j^{(k)} = u_j^{(k)} \cdot \rho_j^{(k)} + c_j^{(k)}.$$

10. A method according to claim 9, wherein score $\rho_j^{(k)}$ is a logarithm of the likelihood.

11. A method according to claim 8, wherein the step of using additional parameters to characterize a pronunciation network for a particular word includes weighting the state scores for each subword HMM assigned to a specific arc j of the pronunciation network for the k-th word, by obtaining a modified score $g_j^{(k)}$ as follows:

$$g_j^{(k)} = \sum_{s=1}^{S_j^{(k)}} [w_{js}^{(k)} \cdot \rho_{js}^{(k)} + c_{js}^{(k)}]$$

where $w_{js}^{(k)}$ is a state weight multiplicative term for the s-th state of the j-th arc HMM in the pronunciation network for the k-th word, $\rho_{js}^{(k)}$ is a corresponding score for the s-th state, $c_{js}^{(k)}$ is a state weight additive term, $S_j^{(k)}$ is a total number of HMM states for the subword unit assigned to the j-th arc of the pronunciation network for the k-th word.

12. A method according to claim 8, wherein the step of using additional parameters to characterize a pronunciation network for a particular word includes:

using estimates of the probabilities $\hat{P}(l_n^{(k)}|\Lambda)$ for all the $N^{(k)}$ phonemes strings $l_n^{(k)}$ ($1 \leq n \leq N$) which may be generated by the k-th word pronunciation network.

13. A method according to claim 12, including the following step:

upon initialization, evaluating the pronunciation network parameters $\hat{P}(l_n^{(k)}|\Lambda)$ by counting the number of strings of subwords assigned to the n-th cluster of the k-th word pronunciation network, $l_n^{(k)}$ being the centroid for the cluster, $\hat{P}(l_n^{(k)}|\Lambda)$ being modified during an adaptation of the k-th word pronunciation network if that word is supposed to be the true one.

14. A method according to claim 9 or 11, wherein the step of using additional parameters to characterize a pronunciation network for a particular word includes:

defining a phone duration weighting, in which the phone HMMs are semi-Markov models:

$$G_j^{(k)} = g_j^{(k)} + z_j^{(k)} \cdot \phi(T_j^{(k)}) + x_j^{(k)}$$

where $G_j^{(k)}$ is a modified score for the j-th arc of the k-th word pronunciation network, $z_j^{(k)}$ is a multiplicative term for the duration weighting, $x_j^{(k)}$ is a corresponding additive term for the duration weighting defining a phone insertion penalty, $T_j^{(k)}$ is a duration for the semi-Markov HMM assigned to the j-th arc of the k-th word pronunciation network, and $\phi(T_j^{(k)})$ is a log probability to obtain duration $T_j$.

15. A method according to claim 8, wherein the step of using additional parameters to characterize a pronunciation network for a particular word includes:

using a discriminative minimum classification error to optimize the parameters of the pronunciation network.

16. A method according to claim 8, wherein the step of using additional parameters to characterize a pronunciation network including adapting the parameters that describe the pronunciation networks as follows:

determining a class k that represents a current adaptation sample O:

$$O \Rightarrow O^{(k)}$$

adjusting the estimates $\hat{P}(l_n^{(k)}|\Lambda)$ for all pronunciation string probabilities ($1 \leq n \leq N^{(k)}$) based on a set of a posteriori probability estimates for the adaptation sample $O^{(k)}$ consisting of $N^{(k)}$ probability estimates $\hat{P}(O^{(k)}|\Lambda, l_n^{(k)})$;

using the adjusted values for $\hat{P}(l_n^{(k)}|\Lambda)$ to reevaluate the distances $G(S^{(r)}; S^{(k)})$ from all of the pronunciation networks $S^{(r)}$ ($1 \leq r \leq K$) to the specified network $S^{(k)}$;

using the reevaluated distances $G(S^{(r)}; S^{(k)})$ to adapt the parameters for all pronunciation networks.

17. A method according to claim 16, wherein the step of adjusting the estimates $\hat{P}(l_n^{(k)}|\Lambda)$ for all pronunciation string probabilities ($1 \leq n \leq N^{(k)}$) based on a set of a posteriori probability estimates for the adaptation sample $O^{(k)}$ consisting of $N^{(k)}$ probability estimates $\hat{P}(O^{(k)}|\Lambda, l_n^{(k)})$, includes adjusting the estimates $\hat{P}(l_n^{(k)}|\Lambda)$ for a new adaptation sample $O^{(k)}$ representing the k-th pronunciation network as follows:

estimating the a posteriori probabilities:

$$\hat{P}(O^{(k)}|\Lambda, l_n^{(k)}) = \exp[\hat{g}(O^{(k)}|\Lambda, l_n^{(k)})]; \ 1 \leq n \leq N^{(k)}$$

where $\hat{g}(O^{(k)}|\Lambda, l_n^{(k)})$ is a likelihood score obtained after Viterbi decoding of the sample $O^{(k)}$ versus phone string $l_n^{(k)}$, and where $N^{(k)}$ is the total number of such phone strings for the network k;

estimating $\hat{P}(l_n^{(k)}|\Lambda, O^{(k)})$ as follows:

$$\hat{P}(l_n^{(k)}|\Lambda, O^{(k)}) = \frac{\hat{P}(O^{(k)}|\Lambda, l_n^{(k)})}{\sum_{n=1}^{N^{(k)}} \hat{P}(O^{(k)}|\Lambda, l_n^{(k)})}$$

estimating an adapted value $\hat{P}_{adapt}(l_n^{(k)}|\Lambda)$ by combining the value of $\hat{P}(l_n^{(k)}|\Lambda)$ and the adaptation-conditioned value of $\hat{P}(l_n^{(k)}|\Lambda, O^{(k)})$ as follows:

$$\hat{P}_{adapt}(l_n^{(k)}|\Lambda) = L \cdot \hat{P}(l_n^{(k)}|\Lambda) + (1-L) \cdot \hat{P}(l_n^{(k)}|\Lambda, O^{(k)}); \ 1 \leq n \leq N^{(k)}$$

where $0 < L < 1$, and where L is a constant or a function that is dependent on time;

normalizing the value of $\hat{P}_{adapt}(l_n^{(k)}|\Lambda)$ as follows:

$$\hat{P}_{adapt}^{norm}(l_n^{(k)}|\Lambda) = \frac{\hat{P}_{adapt}(l_n^{(k)}|\Lambda)}{\sum_{n=1}^{N^{(k)}} \hat{P}_{adapt}(l_n^{(k)}|\Lambda)}; 1 \le n \le N^{(k)}$$

assigning normalized values $\hat{P}_{adapt}^{norm}(l_n^{(k)}|\Lambda)$ the corresponding adjusted values of $\hat{P}(l_n^{(k)}|\Lambda)$ as follows:

$$\hat{P}(l_n^{(k)}|\Lambda) = P_{adapt}^{norm}(l_n^{(k)}|\Lambda); 1 \le n \le N^{(k)}.$$

18. A method according to claim 16, wherein the step of using the reevaluated distances G (S$^{(r)}$; S$^{(k)}$) to adapt the parameters for all pronunciation networks includes using a minimum classification error criterion.

19. A speech recognition system, comprising:
   a speech data input;
   a digital speech sampler for digitally sampling the speech data input;
   an acoustic signal processor for processing the digitally sampled data;
   a speech recognition stage for recognizing subwords and words in the digitally sampled and processed data by comparing the data with a pronunciation network structure, the pronunciation network structure being generated by the following method:
   using given speech data and the N-best algorithm to generate alternative pronunciations and then merging the obtained pronunciations into a pronunciation network structure containing pronunciation networks for words in the given speech data;
      using additional parameters to characterize the pronunciation network for a particular word;
      optimizing the parameters used to characterize the pronunciation network using a minimum classification error criterion that maximizes a discrimination between pronunciation networks for different words;
      adapting parameters used to characterize the pronunciation network by, first, adjusting probabilities of the possible pronunciations that may be generated by the pronunciation network for a word claimed to be a true one and, second, to correct weights for all of the pronunciation networks in the pronunciation network structure by using the adjusted probabilities.

20. A speech recognition system, comprising:
   a speech data input;
   a digital speech sampler for digitally sampling the speech data input;
   an acoustic signal processor for processing the digitally sampled data;
   a speech recognition stage for recognizing subwords and words in the digitally sampled and processed data by comparing the data with stored pronunciation networks, the stored pronunciation networks generated from given speech data contained in a training sample $O^{(k)}$ using the following method:
   (a) performing the N-best algorithm on training sample $O^{(k)}$, transforming it from a feature space X into a discrete string space L:

$$X \Rightarrow L; O^{(k)} \stackrel{N-best}{\Longrightarrow} \{l_n^{(k)}\}, 1 \le n \le N$$

where $l_n^{(k)}$ ($1 \le n \le N$) is a set of N-best pronunciations for the sample $O^{(k)}$, and where the strings $l_n^{(k)}$ ($2 \le n \le N$) cover the space in the vicinity of best decoded string $l_l^{(k)}$;

(b) defining the score for best decoded string $l_l^{(k)}$ as $\rho(l_l^{(k)})$ and defining a score interval $\Delta\epsilon$;
   (c) detecting strings satisfying the following condition:

$$[\rho(l_l^{(k)})-n\cdot\Delta\epsilon; \rho(l_l^{(k)})-(n-1)\cdot\Delta\epsilon], 1 \le n \le N$$

using a backward search, selecting those string, the scores of which fall into score intervals that have not yet been occupied by already grown strings; and (d) merging the obtained N pronunciation strings into a pronunciation network.

* * * * *